United States Patent [19]
Masaki

[11] 3,732,696

[45] May 15, 1973

[54] VEHICULAR AIR-POLLUTION PREVENTIVE

[75] Inventor: Kenji Masaki, Yokosuka, Japan

[73] Assignee: Nissan Motor Company, Limited, Yokohama, Japan

[22] Filed: May 5, 1971

[21] Appl. No.: 140,456

[30] Foreign Application Priority Data

| June 2, 1970 | Japan | 45/46866 |
| Nov. 24, 1970 | Japan | 45/102661 |
| Nov. 24, 1970 | Japan | 45/12662 |

[52] U.S. Cl. .................. 60/274, 60/284, 60/286, 60/303, 123/122 D, 123/122 AA, 123/122 H, 123/142.5 R
[51] Int. Cl. ..................... F02b 75/10, F02m 31/06
[58] Field of Search ................. 60/284, 286, 303, 60/274; 123/122 D, 122 AA, 142.5 R, 179 H, 122 H

[56] References Cited

UNITED STATES PATENTS

| 2,953,898 | 9/1960 | Cornelius | 60/284 |
| 2,956,865 | 10/1960 | Williams | 60/303 |
| 3,174,277 | 3/1965 | Hettich | 60/297 |
| 3,203,168 | 8/1965 | Thomas | 60/286 |
| 3,360,927 | 1/1968 | Cornelius | 60/284 |
| 3,400,700 | 9/1968 | Lindsey | 123/142.5 R |
| 3,481,144 | 12/1969 | Morrell | 60/286 |
| 3,646,764 | 3/1972 | Nakajima | 60/286 |

FOREIGN PATENTS OR APPLICATIONS

| 1,128,505 | 8/1956 | France | 60/286 |

*Primary Examiner*—Douglas Hart
*Attorney*—John Lezdey

[57] ABSTRACT

Herein disclosed are arrangements for use in reducing concentrations of unburned hydrocarbons and carbon-monoxides contained in the exhaust gases from gasoline-powered internal combustion engines for motor vehicles especially during engine warm-up operation in which the unburned hydrocarbons and carbon-monoxides are emitted in high concentrations due to the low temperatures of the engine exhaust gases and the engine cooling medium. Such arrangements are adapted to heat the engine exhaust gases when the exhaust gases and/or the cooling medium are maintained at temperatures lower than a predetermined level. The arrangements may be such that not only the engine exhaust gases but the engine cooling medium is heated concurrently yet independently, wherein only the exhaust gases may be heated if the temperature of the exhaust gases decreases under the predetermined level. Means may also be provided in combination with these arrangements so as to forcedly supply fresh air into the exhaust system for assisting in the re-combustion of the exhaust gases therein.

28 Claims, 10 Drawing Figures

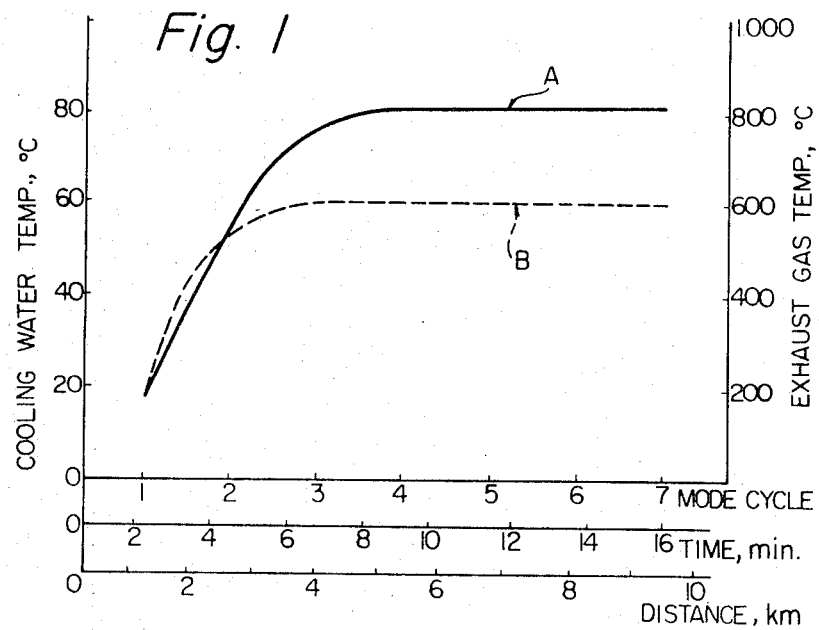
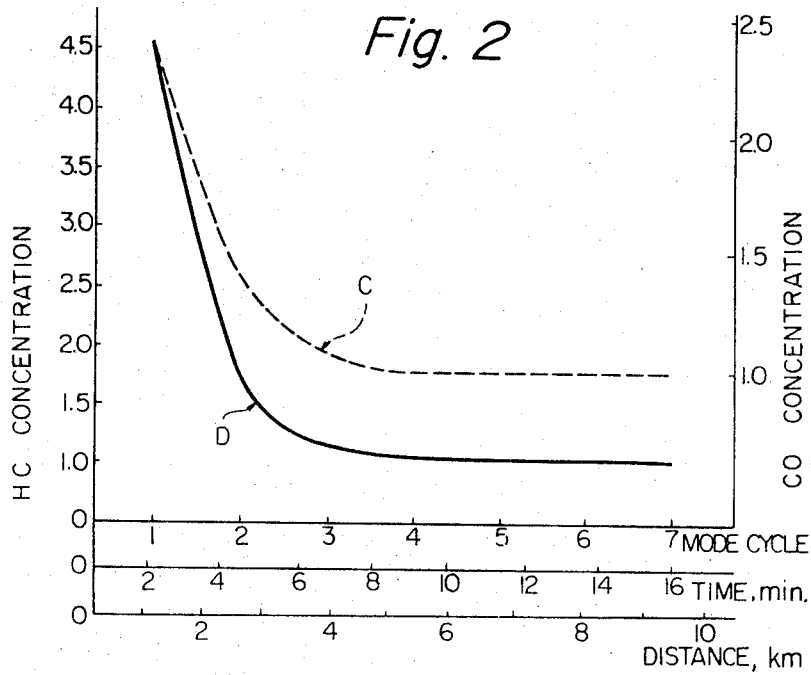

VEHICULAR AIR-POLLUTION PREVENTIVE

This invention relates generally to gasoline-powered internal combustion engine for motor vehicles and, more particularly to method and apparatus for reducing concentrations of unburned hydrocarbons and carbon-monoxides emitted from the engines causing air pollution problems.

The experiments conducted by the inventor with various water-cooled gasoline-powered internal combustion engines show that the concentrations of the unburned hydrocarbons and carbon-monoxides contained in the exhaust gases from the engine closely related to the temperatures of the engine exhaust gases and the engine cooling water and that the lower the temperature of the engine cooling water, the lower is the temperature of the engine exhaust gases. The concentrations of the unburned hydrocarbons and carbon-monoxides increase abruptly when the temperature of the cooling water rises beyond about 50° C and accordingly the temperature of the exhaust gases rise beyond about 550° C. By the time at which the cooling water and the exhaust gases are warmed up to these temperatures, the motor vehicle should be driven in about two mode cycles. The term "mode cycle" as herein used is intended to refer to a cycle of a certain driving mode of the vehicle such as the idling, accelerating, normal cruising and decelerating modes. The concentrations of the unburned hydrocarbons and carbon-monoxides are reduced to minimums when the temperatures of the cooling water and the exhaust gases reach about 80° C and 600° C. In order that these temperatures are reached and the concentrations of the toxic compounds are minimized, the motor vehicle should be driven in about three mode cycles or, in other words, for about 7 minutes and over a distance of about 4 kilo-meters. After these temperatures are reached by the engine cooling water and the engine exhaust gases, the minimized concentrations are substantially maintained, according to the experiments.

It will thus be understood that the concentrations of the unburned hydrocarbons and carbon-monoxides can be successfully reduced if the engine exhaust gases and/or the engine cooling water are warmed up in a shortened period of time during engine warm-up operation. The engine warm-up operation is herein understood to be an operation in which the engine is warmed up until those temperatures which provide minimums of the concentrations of the unburned hydrocarbons and carbon-monoxides. The period of the engine warm-up operation will be further shortened if the engine cooling water as well as the engine exhaust gases is concurrently heated.

Positively heating the engine exhaust gases until the exhaust gases are satisfactorily will prove advantageous, in another aspect, where the internal combustion engine is provided with an exhaust system having an exhaust recombustion unit through which fresh air is supplied into the exhaust system for afterburning the exhaust gases for air-pollution preventive purposes. The exhaust re-combustion unit is usually mounted on an exhaust manifold and/or an exhaust pipe of the exhaust system. Since, in this instance, the exhaust manifold and the exhaust pipe have relatively large thermal capacities, it is difficult that the exhaust gases are warmed up at an early stage of the engine warm-up operation because the exhaust manifold and pipe are made considerably colder through introduction of the fresh air.

It is, therefore, an important object of this invention to provide an improved method and an apparatus for reducing the concentrations of the unburned hydrocarbons and carbon-monoxides in the engine exhaust gases when the temperature of at least either of the engine exhaust gases and the engine cooling water is lower than a predetermined level.

Another important object of this invention is to provide a method and an apparatus for positively heating the engine exhaust gases when the temperatures of the exhaust gases and/or the engine cooling water are lower than predetermined levels, whereby the period of the engine warm-up operation can be significantly shortened to contribute to the reduction of the concentrations of the toxic compounds in the exhaust gases especially during the engine warm-up operation.

Still another important object of this invention is to provide a method and an apparatus by which not only the engine exhaust gases but the engine cooling water is positively heated concurrently when the temperatures thereof are lower than predetermined levels.

Now, it is sometimes experienced in the automotive gasoline-powered internal combustion engines that, depending upon the operating conditions of the engine, the engine exhaust gases happen to lower beyond the predetermined level even after the predetermined operating temperature has already been reached by the engine cooling water. This invites an unforeseen increases in the concentrations of the unburned hydrocarbons and carbon-monoxides in the exhaust gases notwithstanding the warmed-up conditions of the engine. The problems of this nature can be solved by reheating the exhaust gases until the predetermined temperature is reached thereby.

Thus, a further important object of this invention is to provide an improved method and an apparatus for positively heating the engine exhaust gases when the temperature thereof is lower than the predetermined level even though the engine cooling water is satisfactorily warmed.

The method and the apparatus herein proposed to achieve these and other objects of this invention will be more clearly understood from perusal of the following description with reference to the accompanying drawings in which like reference numerals are assigned to corresponding parts and elements and in which:

FIG. 1 is a graphic representation of typical examples of the variation in the concentrations of the unburned hydrocarbons (HC) and carbon-monoxides (CO) in the engine exhaust gases emitted after the motor vehicle has started from the cold engine condition;

FIG. 2 is also a graphic representation of typical examples of the variation in the temperatures of the engine cooling water and the engine exhaust gases after the motor vehicle has started from the cold engine condition;

FIG. 7a is a schematic view showing an example of combustible mixture supply means for use in the arrangement of FIG. 7;

Figure 3:
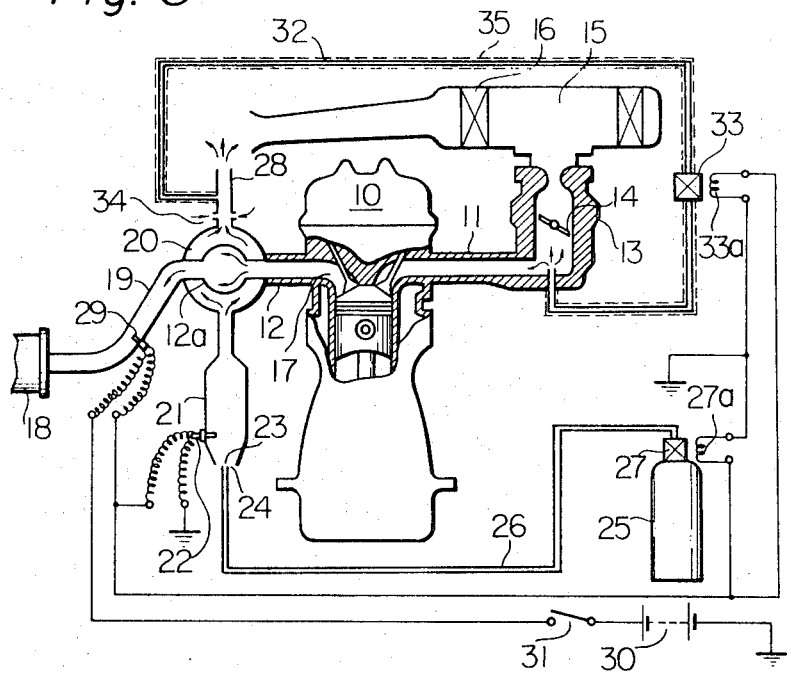
FIGS. 3 and 4 are schematic views showing arrangements in which the exhaust manifold is heated to indirectly heat the engine exhaust gases through detection of the temperature of the exhaust gases.

Reference is first made to FIGS. 1 and 2 in which the results of the previously mentioned experiments are illustrated to show the relationships between the concentration of the unburned hydrocarbons and carbon-monoxides in the engine exhaust gases emitted after the motor vehicle has started from the cold engine condition. The concentrations shown in FIG. 1 are indicated in a ratio to the lowest concentration which is attained when the engine is satisfactorily warmed up. Curves A and B in FIG. 1 show the variations in the temperatures of the cooling water and the exhaust gases respectively while curves C and D in FIG. 2 show the variations in the concentrations of the unburned hydrocarbons and carbon-monoxides. All these curves are plotted in terms of the previously defined mode cycle time in minutes and running distance in kilo-meters of the motor vehicle after the motor vehicle has started.

FIGS. 1 and 2 clearly indicate, when combined, that the concentrations of the unburned hydrocarbons and carbon-monoxides in the engine exhaust gases are closely related to the temperatures of the engine cooling water and the engine exhaust gases. The concentrations of the unburned hydrocarbons and carbon-monoxides decrease considerably as the engine cooling water and the engine exhaust gases are warmed up to approximately 50° C and 550° C respectively after the motor vehicle has been driven in about two mode cycles from the cold engine condition. The concentrations are reduced to minimums and are maintained substantially constant after the temperatures of the cooling water and the exhaust gases have been warmed up to approximately 80° C and 600° C respectively. In order that these temperatures be reached by the cooling water and the exhaust gases, the motor vehicle should be driven in about three mode cycles or for about a 7 minute period and over a distance of about 4 kilo-meters emitting the toxic compounds to the open air. This invention therefore contemplates to have the engine exhaust gases and/or the engine cooling water to be warmed up in a shortened period of time after or even before the engine is started in the cold condition. In the method which is adapted to achieve this end, the temperature of at least either of the exhaust gases and the cooling water is detected so that an electric signal is produced when the temperature is lower than a predetermined level. This predetermined level is selected in a manner to substantially provide minimums of concentrations of the unburned hydrocarbons and carbon-monoxides in the engine exhaust gases. In the presence of the electric signal, the engine exhaust gases are heated by a hot gas which is produced through combustion of a combustible mixture of fuel and air passed to the exhaust system. The engine exhaust gases may be heated anywhere in the exhaust system such as in the exhaust port, exhaust manifold or muffler. To save the consumption of the combustible mixture, it is preferable that the exhaust gases are heated at a location as close to the exhaust valve as possible to make available the relatively high temperature of the exhaust gases therein. Where an afterburning reactor is mounted in the exhaust system, the exhaust gases may be heated in this reactor. The exhaust gases may be heated either directly through mixing of the hot gas and the exhaust gases or indirectly by passing the hot gas to a space substantially surrounding a limited portion of the exhaust system to heat the particular portion. The combustible mixture to produce the hot gas may be a mixture of air and a liquefied fuel gas which is stored in a normally closed container or a mixture of air and a fuel which is supplied from a usual fuel line for the engine. A major portion of the heat in the hot gas is used for heating the exhaust gases. A portion of the heat which is unconsumed may be at least partially introduced into the combustible mixture intake system for the engine so that the combustion mixture which is passed therethrough is satisfactorily atomized to contribute to improvement of the combustion efficiency of the engine. If, in this instance, the hot gas is to be drawn into the carburetor or the intake manifold, the hot gas may preferably be mixed with additional fresh air so as not to cause the combustible mixture to be fired before it reaches the combustion chambers of the engine.

Where desired, not only the engine exhaust gases but the cooling medium such as water for the engine may be heated with essentially the similar results. For this purpose, the temperature of both the exhaust gases and the cooling water are detected so as to produce electric signals when they are lower than predetermined levels which are selected with a view to providing minimums of concentrations of the unburned hydrocarbons and carbon-monoxides. The exhaust gases and the cooling water may be heated either concurrently or independently. To avoid an undue decrease of the temperature of the exhaust gases as occurring after completion of the engine warm-up operation, it is preferably that the exhaust gases are heated when the temperature of the exhaust gases becomes lower than the predetermined level even though the cooling water is in a sufficiently warmed condition.

As an additional feature of the method according to this invention fresh air may be forced into the exhaust system through utilization of the arrangements which are intended to heat the exhaust gases and/or the cooling water. In this instance, such arrangements are used to heat the exhaust gases and/or the cooling water when the temperature or temperatures thereof are lower than the predetermined levels and for supplying fresh air to the exhaust system when such temperatures are reached and consequently the arrangements are inoperative to heat the exhaust gases and/or the cooling water.

A first embodiment of the apparatus according to this invention to carry out the above described method is now shown in FIG. 3. The arrangement herein shown is adapted to heat the exhaust gases through detection of the temperature of the exhaust gases per se.

An engine 10 is shown to have an intake manifold 11 and an exhaust manifold 12 as customary. The intake manifold 11 leads from a carburetor 13 having a throttle valve 14 for regulating the flow of a combustible mixture through the carburetor. The carburetor 13 is vented from the open air through an engine air cleaner 15 having a cleaner element or filter 16. The air cleaner 15, carburetor 14 and intake manifold 11 form part of a combustible mixture intake system for the engine 10. The exhaust manifold 12, on the other hand, leads from an exhaust port 17 and is vented to the open air through a muffler 18. The muffler 18 is shown as connected to the exhaust manifold 12 via an exhaust pipe 19. The exhaust port 17, exhaust manifold 11, muffler 18 and exhaust pipe 19 form part of an exhaust system for the engine 10.

In the shown embodiment, a heat exchanging means 20 is mounted on the exhaust system surrounding a limited portion of the exhaust manifold 12. The heat exchanging means 20 is herein shown as a hot gas chamber which surrounds an enlarged or rounded portion 12a of the exhaust manifold. The hot gas chamber 20 communicates at its inlet to a combustor 21 having an igniter 22, a fuel injection nozzle 23 and an air inlet port 24 formed around the nozzle. The fuel injection nozzle 23 communicates a container 25 storing a liquefied fuel gas through a fuel passage 26 having a normally closed valve means 27 interposed therein. The hot gas chamber 20 is vented on its outlet side to the open air through a discharge passage 28.

The igniter 22 is actuated to fire and the valve means 27 actuated to open when the temperature of the exhaust gases is lower than the predetermined level which is previously discussed. Such selective actuation of the igniter 22 and the valve means 27 is effected by an electric circuit which includes combination detector and switch means 29 and a source 30 of electric power. The combination detector and switch means 29 is located anywhere in the exhaust system, herein shown as mounted in the exhaust manifold 12. The combination detector and switch means 29 detects the temperature of the exhaust gases flowing through the exhaust system and is closed when the detected temperature is lower than the predetermined level. The electric circuit is connected in parallel to the igniter 22 and the valve means 27 and may include an ignition switch 31 for the engine. The valve means 27 may be a normally open solenoid valve which is closed when actuated. Designated by reference numeral 27a is an actuating coil to be connected to the electric circuit in this instance.

When the valve means 27 is open with the combination detector and switch means 29 closed, communication is established between the container 25 and the fuel injection nozzle 23 so that the liquefied fuel gas in the container 25 is delivered into the combustor 21 through the fuel passage 26. The fuel gas is then burnt through actuation of the igniter 22, producing a hot gas in the combustor 21. The hot gas is supplied to the hot gas chamber 20 thereby to heat the enlarged portion 12a of the exhaust manifold and consequently the exhaust gases flowing therethrough. A major portion of the heat in the hot gas is consumed in heating the exhaust manifold 12 and an unconsumed portion of the heat is discharged to the open air through the discharge passage 28.

A branch passage 32 may lead from the discharge passage 28 and open into the combustible mixture intake system for the engine through a valve means 33, which branch passage is herein shown as opening into the intake manifold 11 by way of example. The valve means 33 is normally closed and is connected to the electric circuit including the combination detector and switch means 29 so as to be actuated to open when the electric circuit is completed with the means 29 closed. This valve means 33 may also be solenoid valve actuated through energization of an actuating coil 33a connected to the electric circuit. The unconsumed portion of the heat in the hot gas which would otherwise be discarded through the discharge passage 28 is in this manner drawn into the intake manifold 11 through the branch passage 32 by the aid of a suction prevailing in the intake manifold. The hot gas is admixed to the combustible mixture flowing through the intake manifold 11, assisting in the atomization of the combustible mixture so as to contribute to improvement of the combustion efficiency of the engine. To prevent the combustible mixture from being fired or overheated before it reaches the combustion chambers (not numbered) of the engine 10, the hot gas may preferably be cooled to a selected temperature before the hot gas is admitted into the intake manifold 11. For this purpose, an air inlet port 34 may be formed in the discharge passage 28 anterior to a junction to the branch passage 32. The hot gas is thus mixed with fresh air before it enters the branch passage 32 and is thereby cooled to the selected temperature. In spite of the illustration given here the air inlet port 34 may be located elsewhere in the branch passage 32. The branch passage 32 may preferably be coated or covered with a heat insulator 35 or an equivalent.

When the predetermined temperature is reached by the exhaust gases thus heated positively, the combination detector and switch means 29 is opened to disconnect the igniter 22 and the valve means 27 and 33 from the power source 31 with result that the supply of the liquefied fuel gas from the container 25 and the firing of the igniter 22 are caused to cease and that the communication between the discharge passage 28 and the intake manifold 11 is blocked, preventing the exhaust gases from being overheated and an undue consumption of the working fuel for the apparatus.

Figure 4:
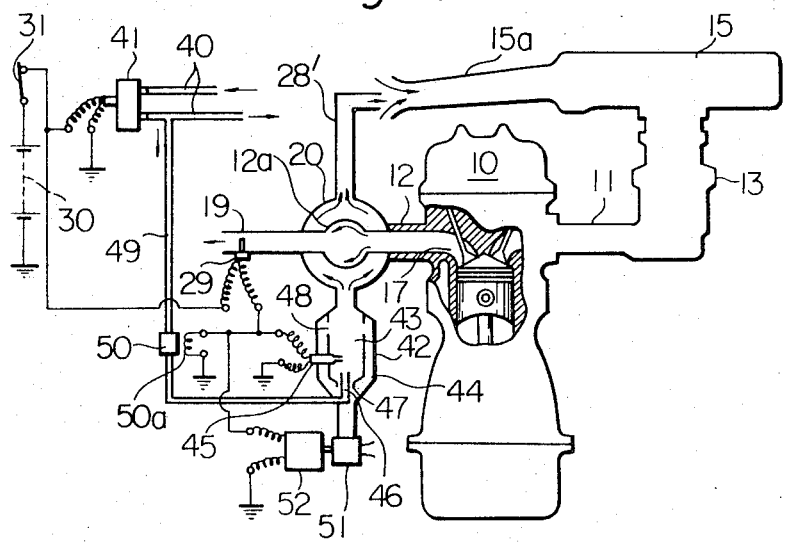

A modification of the embodiment of FIG. 3 is now shown in FIG. 4. The modified apparatus operates essentially similarly to the apparatus of FIG. 3, serving to heat the exhaust gases indirectly through detection of the temperature of the exhaust gases. Different from the apparatus of FIG. 3 in which the liquefied fuel gas is used as the working fuel, the apparatus shown in FIG. 4 utilizes an engine fuel which is usually supplied to the carburetor 13 through an engine fuel line 40 having a pump 41 which may be a magnetic pump by way of example.

The apparatus of FIG. 4 has its heat exchanging means or hot gas chamber 20 communicating, on its inlet side, with a modified combustor 42 which has inner and outer chambers 43 and 44, respectively. An igniter 45 projects into the inner chamber 43 and a fuel injection nozzle 46 is opened adjacent this igniter 45. A primary air inlet port 47 is formed around the fuel injection nozzle 46 while a secondary air inlet port 48 provided communication between the chambers 43 and 44 adjacent the forward end of the combustor 42, as illustrated. The fuel injection nozzle 46 communicates with the engine fuel line 40 downstream of the pump 41 through a fuel passage 49 having a normally closed valve means 50 interposed therein. The primary and secondary air inlet ports 47 and 48, respectively, communicate with an outlet of a blower 51 which is driven by a motor 52 so that a stream of air is forced into the combustor 42 through the primary and secondary air inlet ports when the blower 51 is driven by the motor 52. The hot gas chamber 20, furthermore, is shown to communicate on its outlet side with a discharge passage 28' which is directed to an air inlet opening 15a of the engine air cleaner 15 so that warmed fresh air is mixed with the engine fuel in the intake system when the shown apparatus is operative.

The pump 41, igniter 45, valve means 50 and motor 52 are all connected to and actuated by an electric control circuit including the combination detector and switch means 29, power source 30 and ignition switch 31, similarly to the apparatus of FIG. 3. Where the valve means 50 is of the solenoid actuated type, the valve means may be actuated through energization of an actuating coil 50a connected to the electric control circuit.

When, in operation, the temperature of the exhaust gases in the exhaust manifold 12 is lower than the predetermined level, the combination detector and switch means 29 closed to complete the electric control circuit, actuating the pump 41, igniter 45, valve means 50 and motor 52. The engine fuel in the fuel line 40 is forced by the pump 41 into the fuel passage and passed over to the fuel injection nozzle 46 through the valve means 50 which is now opened. The fuel is mixed with fresh air supplied from the motor driven blower 51 into the inner chamber 43 of the combustor 42 through the primary air inlet port 47 and is caused to burn by the firing of the igniter 45 which is actuated. The combustion of the fuel and the primary air is assisted by air forced into the inner chamber 43 through the secondary air inlet port 48. The hot gas thus produced in the combustor 42 is delivered to the hot gas chamber 20 to heat the enlarged portion 12a of the exhaust manifold 12 surrounded by the chamber 20 and accordingly heat the exhaust gases flowing therethrough. The unconsumed portion of the heat in the hot gas is guided to the air inlet opening 15a of the air cleaner 15 through the discharge passage 28' to warm up the air to be sucked in by the air cleaner.

As soon as the exhaust gases are warmed up to the predetermined temperature, the combination detector and switch means 29 is opened to cause the valve means 50 to close, the igniter 45 to cease firing and the motor 52 to be shut down, thereby preventing an overheating of the exhaust gases and an undue consumption of the engine fuel.

Figure 5:
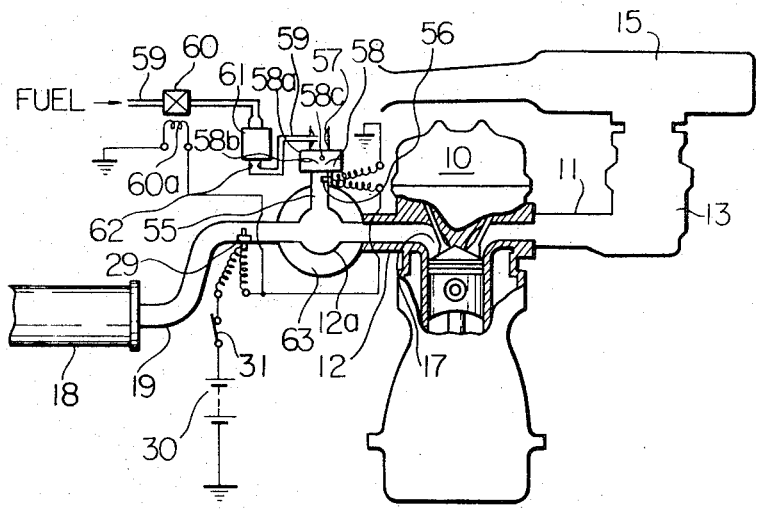
FIGS. 5 and 6 are schematic views showing arrangements in which the exhaust gases are directly heated through detection of the temperature of the exhaust gases.
Figure 6:
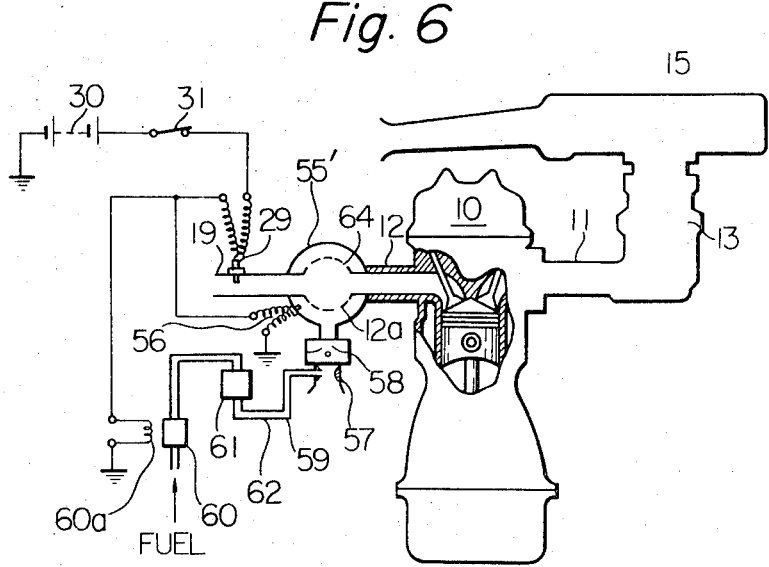

FIGS. 5 and 6 now illustrates embodiments in which the exhaust gases are heated directly by the hot gas through direct exchange of heat therebetween. The two embodiments also use the engine fuel as their working fuels and operate through detection of the temperature of the exhaust gases.

Referring to FIG. 5, the exhaust manifold 12 communicates at its enlarged portion 12a with a combustor 55 into which an igniter 56 projects. The combustor 55 communicates on its inlet side with a constriction or venturi 57 through a one-way check valve 58 which is constructed to permit only a flow toward the exhaust manifold 12. The venturi 57 is vented from the open air to suck is air during operation. A fuel passage 59 leading from an engine fuel line (not shown) opens at its leading end into the venturi 57. The fuel passage 59 has interposed therein a normally closed valve means 60 and a float chamber 61. Which is located posterior to the valve means 60. A restriction or metering orifice 62 may also be mounted in the fuel passage 59 downstream of the float chamber 61. The one-way check valve 58 may preferably be of the type which has an excellent response characteristics and may be made up of a valve casing 58a, a relatively this resilient valve plate 58b secured to the casing and having formed therein a plurality of radially extending slits (not shown) and a stop member 58c located on the upstream side of the valve plate and fast on the casing thereby to make an obstract to an elastic deformation of the valve plate toward the venturi 57. The enlarged portion 12a of the exhaust manifold 12 and the hot gas passage merging therefrom may preferably be covered or coated with a heat insulator 63 to prevent their internal heat from escaping to the atmosphere.

The igniter 56 and valve means 60 are connected to and actuated by an electric control circuit which is essentially similar to its counterparts in the apparatus of FIGS. 3 and 4, including the combination detector and switch means 29, power source 30 and ignition switch 31. The valve means 60 may be a solenoid actuated valve which is normally closed, in which instance the valve means may include an actuating coil 60a connected to the electric control circuit.

When, now, the combination detector and switch means 29 is closed with the temperature of the exhaust gases lower than the previously noted predetermined level, then the valve means 60 is actuated to open and the igniter 56 actuated to fire in the combustor 55. Positive pressures and vacuums prevail alternately in the exhaust system as is well known in the art. When vacuums obtain in the exhaust manifold 12, then atmospheric air is drawn into the venturi 57 and the engine fuel is passed to the venturi through the fuel passage 59 via the valve means 60, float chamber 61 and metering orifice 62. The air and fuel are mixed with each other and atomized in the venturi 57. The resultant combustible mixture is fed into the combustor 55 through the one-way check valve 58 when the vacuums prevail in the exhaust manifold 12. The combustible mixture is thus burnt by the firing of the igniter 56 to produce a hot gas. The hot gas is supplied to the exhaust manifold 12 and mixed with the exhaust gases flowing therethrough, whereupon the exhaust gases are heated directly until the predetermined temperature is reached thereby.

An apparatus shown in FIG. 6 is constructed and operates essentially similarly to the apparatus of FIG. 5, except for the construction of the combustor. The combustor shown by reference numeral 55' in FIG. 6 now communicates with the enlarged or rounded portion 12a of the exhaust manifold 12 through a plurality of apertures 64 formed in the peripheral wall of the portion 12a.

Figure 7:
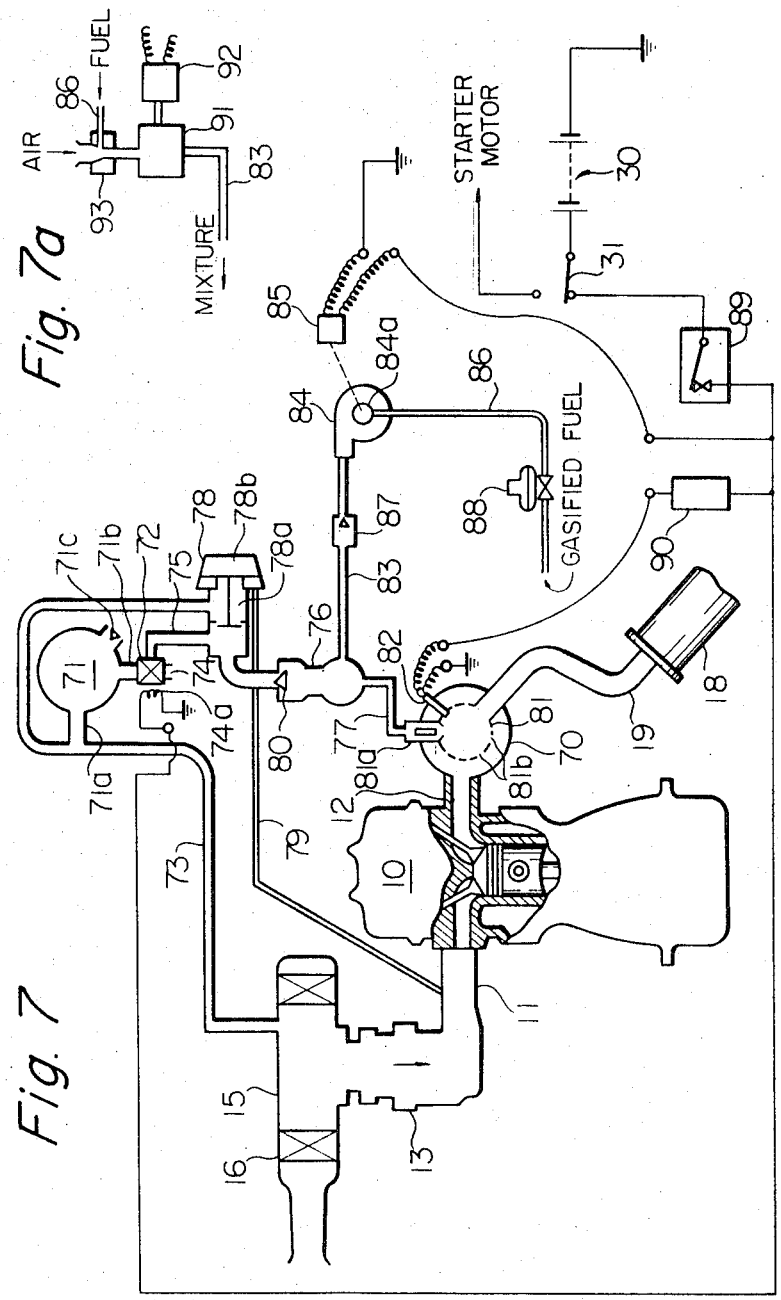
FIG. 7 is a schematic view showing an arrangement in which the exhaust gases are heated through detection of the engine cooling water.

FIG. 7 illustrates an apparatus which is combined with an afterburning reactor used for re-combustion of the unburned combustible content of the engine exhaust gases for air-pollution preventive purposes. The reactor, designated by reference numeral 70, is in itself well known in the art and is herein shown as located intermediate the exhaust port 17 and the muffler 18 by way of example.

The reactor 70 is associated with an air injection unit which serves to forcibly supply fresh air into the reactor for re-combustion of the engine exhaust gases flowing therethrough. The air injection unit includes an air pump 71 which may be driven by the engine 10. The air pump 71 has an air inlet port 71a vented from the open air an air outlet port 71b leading to a three-way valve 72. Denoted by reference numeral 71c is a relief valve which may be mounted on the air pump 71 if desired. The air inlet port 71a of the pump 71 may be led to the engine air cleaner 15 through an air supply passage 73. The three-way valve 72 leading on its inlet side from the outlet port 71b of the pump 71 communicates on its outlet side with a drain port 74 and an air passage 75. This three-way valve 72 is constructed and arranged in such a manner as to permit the outlet port 71b of the pump 71 to normally communicate with the air passage 75 and to communicate with the drain port 74 when the valve 72 is actuated. The air passage 75 leads to an air gallery 76 which, in turn, communicates through an air injection passage 77 with the reactor 70, as illustrated. A vacuum-operated spring-loaded valve means 78 may be provided to preclude back-firing from the engine during deceleration of the motor vehicle. Such valve means 78 may include an atmospheric chamber 78a which is vented from the open air through the passage 73, for instance, and a suction chamber 78b communicating with the intake manifold 11 through a suction passage 79 so that, in the event an increased suction is built up in the intake manifold, an additional air is supplied through the atmospheric chamber 78a, suction chamber 78b which is now in communication with the atmospheric chamber by the suction passed thereinto, and suction passage 79. A one-way check valve 80 may be mounted between the air passage 75 and the air gallery for preventing a reverse flow of the exhaust gases through the passage 75.

In the shown embodiment, the afterburning reactor 70 is provided with a combustor 81 located in the reactor and an igniter 82 projecting into the combustor. The combustor 81 is provided with an injection nozzle 81a and has formed in its wall a plurality of apertures 81b through which the exhaust gases flowing into the reactor 70 is admitted into the combustor. The combustor 81 is opened at its forward end to communicate with the posterior portion of the exhaust manifold 12, as shown. The injection nozzle 81a is herein shown as integral with the air injection passage 77. The air gallery 76 which now communicates with the combustor 81 through the injection nozzle 81a is led through a mixture passage 83 to a combustible mixture supply unit including a blower 84 and motor 85 to drive the blower. The blower 84 communicates on its inlet side with a source (not shown) of a gasified fuel through a fuel passage 86 and on its outlet side with the mixture passage 83. The blower 84 has provided therein a suitable air suction inlet port 84a through which atmospheric air is sucked in and mixed with the gasified fuel which is supplied through the fuel passage 86 when the blower is being driven by the motor 85. A one-way check valve 87 may preferably be mounted in the mixture passage 83 so as to prevent a reverse flow of the exhaust gases to the blower 84. A pressure regulating valve means 88 may also be preferably mounted in the fuel passage 86 thereby to regulate the flow of the gasified fuel to be passed over to the blower 84. The source of the gasified fuel to be used in this embodiment may be supplied from a container storing liquefied fuel gas as is the case with the embodiment shown in FIG. 3 or from a usual engine fuel line as is largely the case with the embodiments shown in FIGS. 4 to 6.

If necessary, the igniter 82 may be connected to a high-voltage generator 89.

The three-way valve 72, igniter 82 (or the high-voltage generator 89 which may be connected thereto) and motor 85 for the blower 84 are connected to and actuated by an electric control circuit which includes a combination detector and switch means 90, power source 30 and ignition switch 31 to be selectively connected to an engine starter motor. The combination detector and switch means 90 is, in this particular embodiment, assumed to be responsive to the temperature of the engine cooling water, being closed when the detected temperature is lower than the predetermined level. This predetermined temperature level is selected with a view to reducing the concentrations of the unburned hydrocarbons and carbon-monoxides in the engine exhaust gases to minimums and may be set in the neighborhood of 60° C by way of example.

When, thus, the combination detector and switch means 90 is closed with the temperature of the engine cooling water lower than such predetermined level as during engine warm-up operation, then the three-way valve 72 is held in a position to establish air communication between the outlet port 71b of the air pump 71 and the drain port 74 and simultaneously the igniter 82 and the motor 85 are actuated. The air from the air pump 71 is thus admitted to the open air with the air passage 75 closed by the valve 72. At the same time, the blower 74 is driven by the motor 85 to supply the combustible mixture and the igniter 82 fires in the reactor 70, by the aid of the high-voltage generator 89 where this is provided. The combustible mixture is forced into the combustor 81 through the mixture passage 83, air gallery 76, air injection passage 77 and injection nozzle 81a in this sequence and is burnt by the firing of the igniter 82 which is now in an actuated condition, producing a hot gas in the combustor 81. The hot gas is mixed with the exhaust gases flowing into the combustor 81 through the apertures 81a formed therein so that the exhaust gases are heated to heat, in turn, the engine cooling water. As soon as the cooling water is warmed up to the predetermined temperature, the combination detector and switch means 90 opens to disconnect the igniter 82 and the motor 85 from the power source 30, with the result that the igniter 82 and the blower 84 are made inoperative. In this condition, the three-way valve 72 is held in a position to establish communication between the pump outlet port 71a and the air passage 75, permitting the pump 71 to supply air to the reactor 70 through the air passage 75, air gallery 76, air injection passage 77 and injection nozzle 78. The air introduced in the reactor assists in the recombustion of the exhaust gases to be discharged through the exhaust manifold.

It well appreciated that the embodiment shown in FIG. 7 is advantageously put into practice where an afterburning reactor is mounted on the exhaust system wherein the air injection unit for the reactor is exploited ingeniously during engine warm-up operation in which introduction of fresh air into the reactor is usually detrimental to early heating of the exhaust gases.

The combustible mixture supplied from the blower 84 may be passed to anywhere in the exhaust system, not necessarily to the reactor 70. For economy of fuel consumption, however, it is preferable that the combustible mixture is delivered to a location as close to the exhaust port 17 as possible. In this instance, it is preferable that the air supplied by the air pump 71 is drawn into the exhaust system at a location substantially upstream of the location at which the combustible mixture is introduced and that the combustible mixture has a relatively low air-to-fuel ratio. Where an arrangement is made in this manner, the combustor 81 may be mounted on a preliminary muffler if available.

The combustible mixture supply unit including the motor driven blower 84 may be modified as illustrated in FIG. 7a in which a blower 91 driven by a motor 92 is provided with a venturi 93 through which atmospheric air and a gasified fuel supplied through the fuel passage 86 are sucked into produce the combustible mixture which is delivered to the mixture passage 83.

The embodiments of this invention which have thus far been described are all adapted to positively heat the engine exhaust gases either directly or indirectly so as to reduce the concentrations of the unburned hydrocarbons and carbon-monoxides in the engine exhaust gases especially during engine warm-up operation. This purpose can be achieved, with substantially the same results, by positively heating both the engine exhaust gases and the engine cooling water concurrently. Since, as previously noted, it happens that the temperature of the exhaust gases decreases beyond the predetermined level even after the engine warm-up operation when the engine cooling water is sufficiently warmed up, it is in this instance preferable that the exhaust gases and the cooling water are heated independently through detection of the temperatures of both of the exhaust gases and cooling water. An embodiment to realize this concept is now illustrated in FIG. 8 in the drawings. The embodiment of FIG. 8 is shown to include an air injection unit which is adapted to supply secondary or additional air for aiding in the combustion of a combustible mixture to produce a hot gas for heating the exhaust gases.

Figure 8:
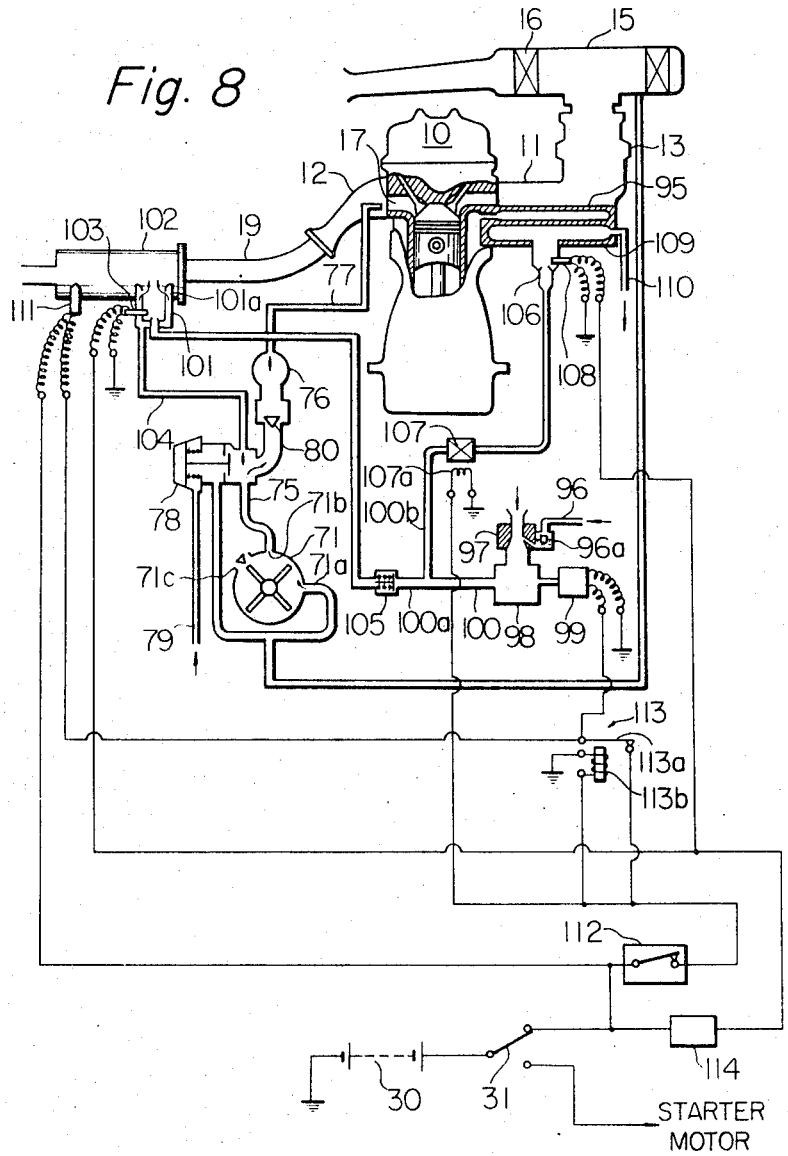
FIG. 8 is a schematic view showing an arrangement in which both the exhaust gases and the cooling water are heated either concurrently of independently through detection of the temperatures thereof.

Referring to FIG. 8, the engine 10 is shown as including an engine cooling circuit which is partly illustrated by reference numeral 95. In this embodiment, the working fuel is assumed to be supplied from a usual engine fuel line through a fuel passage 96 but, if preferred, a liquefied fuel gas which is stored in a container independently of the fuel line may be used as in the embodiment of FIG. 3. The fuel passage 96 is opened into a venturi 97 which is vented from the open air to suck in atmospheric air during operation. The venturi 97 is connected to an inlet port (not numbered) of a blower 98 which is driven by a motor 99. An outlet port (not numbered) of the blower 98 merges into a mixture passage 100 so that, when the blower is driven by the motor 99, an atomized comnustible mixture which is produced by mixing of the air and fuel sucked in into the venturi 17 is forced into the mixture passage 100 by the blower 98. The fuel supply unit herein shown is largely similar to the corresponding unit shown in FIG. 7a but now includes a float chamber 96 forming part of the fuel passage 96. The mixture passage 100 diverts into first and second branch passages 100a and 100b, respectively. The first branch passage 100a is led toward the exhaust system while the second branch passage 100b is led to the engine cooling circuit 95. The first branch 100a is opened at its leading end anywhere in the exhaust through a combustor 101, herein shown as being opened into a combination muffler and reactor 102 mounted anterior to the exhaust manifold 12. The combustor 102 includes an igniter 103 which projects into the combustor and which is actuated to fire concurrently as the combustible mixture is supplied through the branch passage 100a into the combustor thereby to burn the mixture for producing a hot gas. The combustor 101 has a secondary air inlet port 101a leading from an air injection unit through a secondary air injection passage 104. This air injection unit per se is essentially analogous in construction to its counterpart of the apparatus shown in FIG. 7, including an air pump 71 which may be driven by the engine 10. The air pump 71 sucks in air through an air supply passage 73 which is vented from the open air as in the engine air cleaner 15 by way of example. The air is pumped by the air pump 71 to the secondary air injection passage 104 and, if desired, to the exhaust manifold 12 or exhaust port 17 through an air gallery 76 and an air injection passage 77. The air injection unit may also include a vacuum-operated spring-loaded valve means 78 communicating with the intake manifold 11 through a suction passage 79 and with the air supply passage 73 through a passage 73a for preventing backfiring from the engine during deceleration in a manner previously discussed. A one-way check valve 80 is also mounted an inlet to the air gallery 76 and a relief valve 71c is mounted on the air pump 71. To prevent the exhaust gases from flowing reversely into the mixture passage 100, a one-way check valve 106 may be mounted in the branch passage 100a downstream of a junction to the second branch passage 100b.

The second branch passage 100b, on the other hand, leads to a combustor 106 through a normally closed valve means 107 which may be of the solenoid actuated type. The combustor 106 includes an igniter 108 projecting thereinto and is opened into a hot gas chamber 109. The hot gas chamber 109 is held in contact with a limited portion of the engine cooling circuit 95 through which the engine cooling water is circulated, thus acting as a heat exchanging means. The hot gas chamber 109 is opened to the atmosphere preferably through a discharge passage 110 which is directed to any structural part of the engine combustible mixture intake system or admitted directly into the intake system so as to warm up the engine combustible mixture for assisting in the atomization thereof.

Figure 8A:
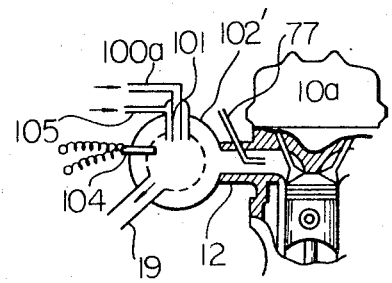
FIG. 8a is a schematic view showing an example of combustible mixture supply means for use in the arrangement of FIG. 8.

Although the combustor 101 for heating the exhaust gases is herein shown as mounted on the combination muffler and reactor, the same may be located elsewhere if desired or depending upon the specific construction of the exhaust system used. If, for instance, the exhaust system is of the type which is provided with a reactor 102' as illustrated in FIG. 8a, the combustor 101 may be mounted in this reactor 102'. Or otherwise, the combustor 101 may be located anywhere in the more downstream portion of the exhaust system such as in a main muffler though not illustrated.

The blower driving motor 99, igniter 103 of the combustor 101, valve means 107, and igniter 108 of the combustor 106 are all connected in parallel to an electric control circuit which includes a power source 30, ignition switch 31 and first and second combination detector and switch means 111 and 112, respectively. The combination detector and switch means 111 and 112 respectively are mounted anywhere in the exhaust system and the engine cooling circuit so as to be responsive to the temperatures of the engine exhaust gases and the engine cooling water. The first combination detector and switch means 111 is connected between the power source 30 and the motor 99 for the blower 98 and is closed when the temperature of the exhaust gases detected thereby is lower than the predetermined level thereby to energize the motor 99 in this condition. Likewise, the second combination detector and switch means 112 is connected between the power source 30 and the valve means 107 and is closed when the temperature of the engine cooling water is lower than the predetermined level so as to actuate the valve means 107 to open. The means 111 and 112 are thus connected in parallel to each other and act independently from each other. The second detector and switch means 112 is further connected to the motor 99 through a relay switch 113 having a normally-open contact 113a and a solenoid 113b so that the motor 99 is energized not only the means 111 but the means 112 is closed. The igniters 103 and 108 are constantly connected to the power source 30 and are at all times actuated to fire insofar as the ignition switch 31 is closed. If necessary, a high-voltage generator 114 may be connected between the power source 30 and the igniters 103 and 108. The valve means 107 may be of the solenoid actuated type having an actuating coil 107a through which the valve means is connected to the electric control circuit.

When, now, the temperatures of the engine exhaust gases and the engine cooling water are lower than the predetermined levels concurrently, then both of the first and second combination detector and switch means 111 and 112 are closed to energize the blower driving motor 99 and to actuate the valve means 107 to open. The combustible mixture supplied from the venturi 97 is thus passed to the combustors 101 and 106 through the branch passage 100a and 100b, respectively, and is burnt by the firing of the igniters 103 and 106 to produce a hot gas therein. The hot gas produced in the combustor 101 is fed into the combination muffler and reactor 102 so as to heat the exhaust gases flowing therethrough, while the hot gas produced in the combustor 106 is fed into the hot gas chamber 109 to heat the engine cooling water circulated through the cooling circuit 95. The supply of the combustible mixture to the combustors 101 and 106 is cut off when the exhaust gases and the cooling water are warmed up to the predetermined temperatures and accordingly the first and second combination detector and switch means 111 and 112, respectively, are opened. The exhaust gases and the cooling water are in this manner prevented from overheated and the undue consumption of the fuel is avoided.

In the event the temperature of the exhaust gases lowers under the predetermined temperature after the engine warm-up operation with the cooling water in a satisfactorily warmed condition, the first combination detector and switch means 111 closes to energize the motor 99, supplying the combustible mixture to the combustor 101 to re-heat the exhaust gases until the predetermined temperature is reached thereby. In this condition, the valve means 107 is kept closed with the second combination detector and switch means 112 kept open so that the combustible mixture is not supplied to the combustor 106.

The embodiment shown in FIG. 8 is thus adapted to reduce the concentrations of the unburned hydrocarbons and carbon-monoxides not only during engine warm-up operation but during any other mode of operations in which the engine exhaust gases fail to be warmed to the predetermined temperature.

What is claimed is:

1. A method for reducing concentrations of unburned hydrocarbons and carbon-monoxide in exhaust gases from a gasoline-powered internal combustion engine for motor vehicles which engine has an intake system, an exhaust system and a cooling circuit, comprising detecting at least one of the temperatures of exhaust gases in said exhaust system and a cooling medium in said cooling circuit, producing an electric signal when the detected temperature is lower than a predetermined level which is selected to provide minimums of said concentrations, supplying a fuel in accordance with said electric signal, burning said fuel to produce hot gases, and heating exhaust gases from said engine by said hot gases, in which said hot gases are supplied to a space substantially surrounding a limited portion of said exhaust system for heating the particular portion by said hot gases, and in which at least part of the hot gases discharged from said space are directed to a part of said intake system.

2. A method according to claim 1, in which at least part of the hot gases are supplied into an intake manifold of said intake system for assisting in the atomization of a combustible mixture flowing therethrough.

3. A method according to claim 1, in which at least part of the hot gases are supplied adjacent an opening of an air cleaner of said intake system.

4. A method according to claim 1, in which said fuel is supplied from a source of a liquefied fuel gas.

5. A method according to claim 1, in which said fuel is supplied from a fuel line for said engine.

6. A method according to claim 1, in which both of said temperatures of the engine exhaust gases and the engine cooling medium are detected for producing electric signal when said temperatures are lower than predetermined levels which are selected to provide minimums of said concentrations for heating both of the exhaust gases and the cooling medium independently from each other.

7. A method according to claim 6, in which the electric signal for heating the exhaust gases is produced even in the absence of the electric signal for heating the cooling medium when the temperature of the exhaust gases is lower than the predetermined level with said cooling medium warmed above the predetermined level.

8. In combination with a gasoline-powered internal combustion engine for motor vehicles which engine has an intake system, an exhaust system and a cooling circuit, of an apparatus for reducing concentrations of unburned hydrocarbons and carbon-monoxide in exhaust gases from said engine, a combination detector and switch means for detecting at least one of the temperatures of exhaust gases mounted in said exhaust system and a cooling medium in said cooling circuit and for producing an electric signal when the detected temperature is lower than a predetermined level which is selected to provide minimums of said concentrations, fuel supply means for supplying a fuel in accordance with said electric signal, combustor means connected to said fuel supply means for burning said fuel supplied therefrom to produce hot gases for heating exhaust gases from said engine, a hot gas chamber substantially surrounding a limited portion of said exhaust system and communicating with said combustor means for introducing hot gases therefrom, and a discharge passage communicating with said hot gas chamber and directed to a part of said intake system.

9. The combination according to claim 8, in which said discharge passage opens into an intake manifold of said intake system.

10. The combination according to claim 8, in which said discharge passage opens adjacent an opening of an air cleaner of said intake system.

11. The combination according to claim 8, in which said discharge passage has formed therein an air inlet port through which air is introduced into the discharge passage for diluting and cooling the hot gas to be discharged through the discharge passage.

12. The combination according to claim 8, in which said combustor means includes a injection nozzle communicating with said fuel supply means and an igniter positioned adjacent said injection nozzle and electrically connected to a source of electric power for being caused to fire when said engine is driven.

13. The combination according to claim 12, in which said combustor means has an air inlet port formed around said injection nozzle.

14. The combination according to claim 8, in which said combustor means has a secondary air inlet port which is formed in a forward end portion of the combustor.

15. The combination according to claim 14, in which said secondary air inlet port communicates with an air pumping means whereby air is forcedly passed through said secondary air inlet port into said combustor.

16. The combination according to claim 12, in which said igniter is connected to said source of electric power through a high-voltage generator.

17. The combination according to claim 8, in which said fuel supply means includes a gasified fuel supply means communicating with said combustor means.

18. A combination according to claim 17, in which said gasified fuel supply means includes a container storing a liquefied fuel and communicating with said combustor means for introducing the liquefied fuel gas into said combustor means when said combination detector and switch means is closed.

19. The combination according to claim 8, in which said fuel supply means includes a fuel passage leading from a fuel line for the engine for supplying to said combustor means a fuel passed from the fuel line when the combination detector and switch means is closed.

20. The combination according to claim 19, in which said fuel supply means further includes a venturi which is vented from the open air and into which said fuel passage is opened for producing the fuel in an atomized condition.

21. The combination according to claim 17, in which said fuel supply means further includes a normally closed valve means which is electrically connected to said combination detector and switch means, said valve means being actuated to open when the combination detector and switch means is closed.

22. The combination according to claim 17, in which said fuel supply means further includes a blower driven by a motor which is electrically connected to said combination detector and switch means and which is energized to drive said blower when said combination detector and switch means is closed whereby the fuel is forcedly supplied to said combustor means.

23. The combination according to claim 22, in which said blower has an air inlet port vented from the atmosphere.

24. The combination according to claim 8, further comprising a second combination detector and switch means detecting the other of said temperatures of the exhaust gases and the cooling water, said second combination detector and switch means being electrically connected in parallel to the first named combination detector and switch means and closed when the temperature detected there is lower than a predetermined level which is selected to substantially provide minimums of said concentrations of the unburned hydrocarbons and carbon-monoxides in said exhaust gases, a second combustor means electrically connected to said second combination detector and switch means and actuated to fire when said engine is driven, said second combustor means communicating with said fuel supply means through a normally closed valve means which is electrically connected to said second combination detector and switch means and actuated to open when the second combination detector and switch means is closed, and a hot gas chamber which is in contact with a limited portion of said cooling circuit and which communicates with said second combustor means, said fuel being passed to said combustor means and burnt to produce a hot gas when said valve means is open, the hot gas being passed into said hot gas chamber to heat said limited portion of the cooling circuit and accordingly the cooling medium therein.

25. The combination according to claim 24, further comprising a discharge passage leading from said hot gas chamber into said intake system.

26. The combination according to claim 24, further comprising a normally open relay switch electrically connected to said second combination detector and switch and closed when energized with said second combination detector and switch means closed for actuating said fuel supply means to supply the fuel.

27. The combination according to claim 19, in which said fuel supply means further includes a normally closed valve means which is electrically connected to said combination detector and switch means, said valve means being actuated to open when the combination detector and switch means is closed.

28. The combination according to claim 19 in which said fuel supply means further includes a blower driven by a motor which is electrically connected to said combination detector and switch means and which is energized to drive said blower when said combination detector and switch means is closed whereby the fuel is forcedly supplied to said combustor means.

* * * * *